Dec. 28, 1954
R. S. CARR ET AL
2,698,353
ELECTRIC CABLE
Filed Dec. 9, 1950
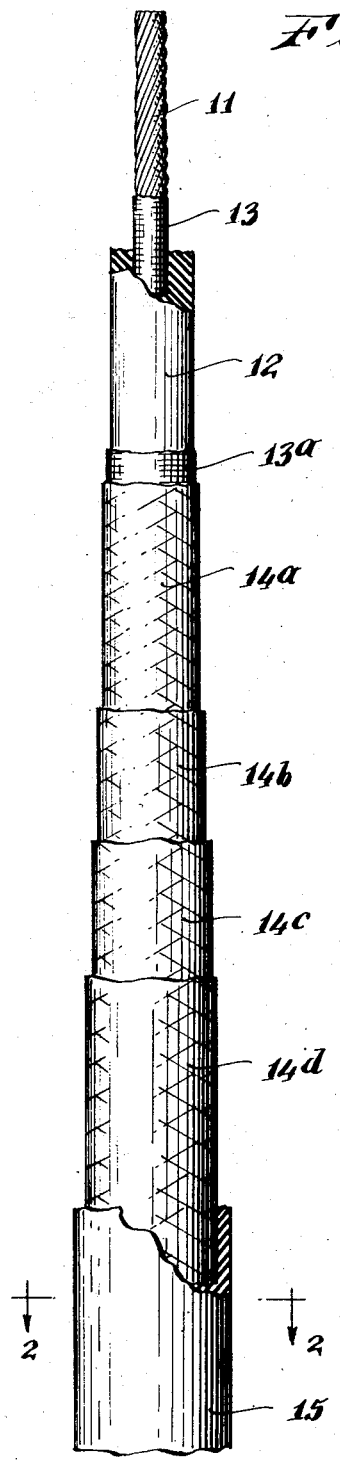
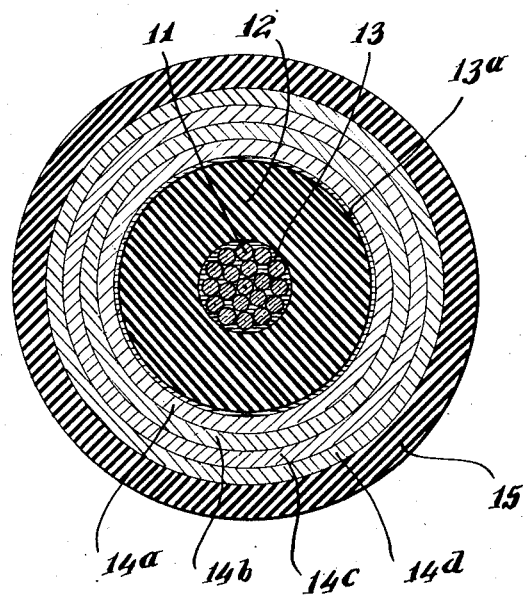
INVENTORS.
Robert S. Carr
Tore N. Anderson
BY
Fraser, Myers & Manley
ATTORNEYS.

United States Patent Office 2,698,353
Patented Dec. 28, 1954

2,698,353

ELECTRIC CABLE

Robert S. Carr, Maplewood, N. J., and Tore N. Anderson, Huntington Station, N. Y., assignors to Airtron, Inc., Linden, N. J., a corporation of New Jersey Application December 9, 1950, Serial No. 199,944

9 Claims. (Cl. 174—24)

This invention relates to improvements in cables for conducting electrical energy and to an improved method of making the same. It is useful both with respect to coaxial cables and single, central-conductor cables and may be employed in cables intended for use under wide variations in ambient temperature conditions.

An important object of this invention is the provision of a cable structure which will operate satisfactorily at a relatively high corona level.

Another important object is the provision of a method for producing a cable having such a high corona level.

It is well understood by those familiar with the art of electrical energy transmission that, as the voltage on a conductor is increased beyond a certain point, commonly called the corona level, there occurs a partial breakdown or ionization of air in any space around the conductor, resulting in the phenomenon known as corona which may become evident as a hissing sound or a glow about the conductor. The voltage at which corona occurs depends upon several factors such as the diameter of the conductor, and the conductor's surface, the distance between conductors, and atmospheric or temperature conditions. It is known that, in cables heretofore developed, the corona level drops sharply with substantial decreases in ambient temperature, possibly because of unequal shrinkage of the various layers of the cable which may cause or enlarge spaces between said layers.

As corona causes substantial power loss it is desirable to provide a cable having a corona level which, at all temperature conditions likely to occur in use, is somewhat higher than the voltage of the current to be conducted. In designing a cable, its corona level may be increased by increasing its diameter, but the application of this principle leads to objectionably large cable diameters and attendant excessive use of materials.

According to the present invention, the problem of raising the corona level of a cable is satisfactorily dealt with by providing, in the cable, a coating of a conducting compound upon the cylindrical surface of a dielectric or insulating sleeve which is face to face to and adjacent to a cylindrical surface of a conductor element of the cable. Thus, as in a coaxial cable as hereinafter described by way of example, the inner cylindrical surface, and preferably, also the outer cylindrical surface of a tubular dielectric element may be coated with a conducting compound. In such an arrangement, the conductive surface or surfaces of the dielectric element are in contact with an adjacent conductor or conductors at many points therealong, thereby assuring substantial equalization of electrical potential in the conductor and at said conductive surface or surfaces of the dielectric. It has been found that this equalization of potential is very effective for materially raising the corona level of a cable.

This invention may be employed advantageously either in low temperature cables which may be designed for use within a range of temperature from about average room temperature to about −55° C., or in high temperature cables which may be designed for use within a range of temperatures from about average room temperature to about 150° C. In designing these two types of cables, the various materials employed for conductor, dielectric, sheath, etc. portions are selected to yield the desired conducting, insulating and protective results while, nevertheless, being capable of resisting physical breakdown which would lead to operational breakdown.

The materials ordinarily selected for the two mentioned types of cables are somewhat different, being, in each case, those which would stand up physically and operationally under the temperature variations which may be encountered in a particular type of service in which the cable is to be used. This invention may also be employed advantageously in what may be termed medium temperature cables which may be designed for use within a temperature range running from somewhat below to somewhat above average room temperature; and the range of temperatures within which the latter type of cable might be used would depend largely upon the particular materials now available or hereafter discovered or developed and upon the temperature range of satisfactory functioning of such materials without material physical breakdown thereof.

The principles of this invention as applicable in either coaxial or single central conductor cables for use under various temperature conditions may be fully understood from a detailed consideration thereof as employed in a low temperature coaxial cable. Therefore, the following description of an improved low temperature coaxial cable embodying this invention should be considered as merely illustrative and as teaching the use of the invention in all the mentioned types of cables.

In the accompanying drawing:

Figure 1 is a side view of a short length of low temperature coaxial cable according to this invention, portions thereof being cut back and some portions being shown fragmentarily in section; and Fig. 2 is a considerably enlarged cross-sectional view of said cable on the line 2—2 of Fig. 1.

The illustrated cable comprises, as coaxially arranged parts, an inner conductor 11 which may be formed of plural strands of tinned copper, an insulating element 12 which may be of plastic dielectric material such as a suitable polyethylene composition extruded tightly onto the inner conductor, and conducting compound 13, initially in the form of fluid which advantageously may be pumped into one end of a length of cable while suction is applied at the other end thereof so that the compound permeates the inner conductor to fill any voids between the several strands thereof and, of primary importance it becomes applied, as a coating, to the inner cylindrical surface of the insulating element. The conducting compound 13 preferably is thus pumped into the cable after the cable has otherwise been completely formed as hereinafter described.

The exterior of the insulating element 12, in the illustrated cable, is coated with conducting compound 13a which may be of the same or different composition as the compound 13, and may be applied to the insulating element by any suitable means, such as, for example, by dipping or brushing. The coated insulating element 12, preferably, has a braided outer conductor braided therearound, the latter consisting of at least one layer 14a of tinned copper strands braided tightly upon the coated insulating element. This first baided conducting layer preferably is applied immediately after the application of the conducting compound 13a. The outer conductor, however, preferably also includes several braided layers 14b, 14c, and 14d, substantially similar to layer 14a, each of layers 14b, c and d being braided tightly about the next inner braided layer. The cable is provided with an outer protective or insulating jacket 15, preferably of plastic dielectric material such as a suitable polyethylene composition. This jacket is extruded tightly about the braided outer conductor.

Experience indicates that the conducting compound 13, 13a should preferably be electrically conductive to a material degree. This suggests that the conducting compound, being in intimate contact with the adjacent surface of a conductor, functions as a part of that conductor; and, as there is no space whatever between the compound and the insulating element which it coats, there is no space within which corona could develop.

Irrespective of the precise nature of the physical reactions in or caused by the presence of the conducting compound, it has been demonstrated that the use of such a compound in a coaxial cable, substantially as hereinbefore described, increases the corona level of a given diameter of cable conductor very substantially beyond the corona level of the same size of conductor in a cable not having the compound therein. Also, comparative tests of cables without the compound therein and similar cables with the compound therein as hereinbefore described show that as ambient temperature is lowered to extreme low temperatures such as —55° C. the corona level of the new compound treated cable drops much less sharply than in the prior cable which do not include such compound therein. Furthermore, such drop in the corona level of compound treated cables under low temperatures is of such a minor degree that low temperature cables according to this invention can now very conveniently handle voltages which heretofore could either not be handled or could only be handled by using excessively large cables which were cumbersome and wasteful of materials.

Although various compositions may be employed as conducting compounds in the manner and for the purposes hereinbefore described, nevertheless it has been found that satisfactory results are obtainable by employing a conducting compound of the following composition:

25 parts by weight of conducting solids of approximately colloidal size; such solids being of any electrically conductive material such as, for example, graphite.

175 parts by weight of alcohol
20 parts by weight of a suitable wetting agent
20 parts by weight of glycerine Such a conducting compound, within a cable, does not dry out if the various parts of the cable are so tightly assembled as to exclude air. When such a tightly assembled cable is cut the conducting compound smears only lightly across the exposed cable end surfaces where an air excluding skin quickly forms to prevent drying of the compound within the cable. Such a smear may easily be wiped away. However, even if the conducting compound should dry or partially dry, the residual colloidal coating still would function to suppress or minimize corona.

It may be understood that if cable, constructed as hereinbefore described but without the conducting compound, were bent as would occur in actual use, the conductor or conductors would separate slightly from the dielectric element and thereby provide space where ionization and consequent corona could occur. When the conducting compound is used, however, it remains effective as a coating of the insulating or dielectric element and as part of the conductors to prevent the formation of any space between the conductors and the dielectric element within which corona might develop. Thus, cable according to this invention maintains a substantially high corona level.

It should be obvious that the concepts of the present invention may be practiced in various ways and types of cables other than those illustrated and described herein while, nevertheless, being within the protective scope set forth in the following claims.

What we claim is:

1. An electric cable comprising a flexible conductor, a flexible dielectric sleeve intimately surrounding said conductor, and a coagulable fluid, conducting composition of lower conductive strength than the material of said conductor, disposed between said conductor and sleeve substantialy throughout the length of the two and about said conductor; said fluid, conducting composition including a liquid, of low viscosity, which is incapable of complete evaporation at temperatuers to which the cable may be subjected in the normal use thereof and conducting solids of approximately colloidal size in said liquid.

2. An electric cable according to claim 1, the said conducting solids being finely divided particles of carbon.

3. An electric cable according to claim 1, the said liquid including glycerine.

4. An electric cable according to claim 1, the said fluid, conducting composition including approximately 25 parts, by weight, of said conducting solids to 20 parts of glycerine.

5. An electric cable comprising a flexible conductor, a flexible dielectric sleeve intimately surrounding said conductor, and a fluid, conducting composition of lower conductive strength than the material of said conductor, disposed between said conductor and sleeve substantially throughout the length of the two and about said conductor; said fluid, conducting composition including a liquid, of low viscosity, which is incapable of complete evaporation at temperatures to which the cable may be subjected in the normal use thereof and conducting solids of approximately colloidal size in said liquid; and the said fluid, conducting composition including approximately 25 parts, by weight, of said conducting solids, 20 parts of glycerine, and 175 parts of alcohol.

6. An electric cable comprising a flexible conductor, a flexible dielectric sleeve intimately surrounding said conductor, and a fluid, conducting composition of lower conductive strength than the material of said conductor, disposed between said conductor and sleeve substantially throughout the length of the two and about said conductor; said fluid, conducting composition including a liquid, of low viscosity, which is incapable of complete evaporation at temperatures to which the cable may be subjected in the normal use thereof and conducting solids of approximately colloidal size in said liquid; and the said fluid, conducting composition including approximately 25 parts, by weight, of said conducting solids, 20 parts of glycerine, 175 parts of alcohol, and 20 parts of a wetting agent.

7. An electric cable comprising a flexible conductor, a flexible dielectric sleeve intimately surrounding said conductor, and a fluid, conducting composition of lower conductive strength than the material of said conductor, disposed between said conductor and sleeve substantially throughout the length of the two and about said conductor; said fluid, conducting composition including a liquid, of low viscosity, which is incapable of complete evaporation at temperatures to which the cable may be subjected in the normal use thereof and conducting solids of approximately colloidal size in said liquid; and the said fluid, conducting composition including approximately 25 parts, by weight, of finely divided particles of carbon, 20 parts of glycerine, 175 parts of alcohol, and 20 parts of a wetting agent.

8. An electric cable comprising a flexible conductor, a flexible dielectric sleeve intimately surrounding said conductor, and a fluid, conducting composition of lower conductive strength than the material of said conductor, disposed between said conductor and sleeve substantially throughout the length of the two and about said conductor; said fluid, conducting composition including a liquid, of low viscosity, which is incapable of complete evaporation at temperatures to which the cable may be subjected in the normal use thereof and conducting solids of approximately colloidal size in said liquid; and the cable, further, including a flexible, sleeve-like outer conductor extending about said dielectric sleeve and additional fluid, conducting composition, similar to the said composition which is between said first-mentioned conductor and said dielectric sleeve, said additional composition being disposed between said outer conductor and said dielectric sleeve substantially throughout the length of said outer conductor and about said dielectric sleeve.

9. An electric cable according to claim 8, the two said conductors each comprising plural wires and said fluid, conducting composition extending between wires of said two conductors and in contact with substantially the entire inner and outer surfaces of said dielectric sleeve.

References Cited in the file of this patent

UNITED STATES PATENTS

| Number | Name | Date |
| --- | --- | --- |
| 225,811 | Eaton | Mar. 23, 1880 |
| 309,244 | Patterson | Dec. 16, 1884 |
| 1,802,605 | Kemp | Apr. 28, 1931 |
| 2,059,146 | Roeterink | Oct. 27, 1936 |
| 2,322,773 | Peters | June 29, 1943 |
| 2,377,153 | Hunter et al. | May 29, 1945 |
| 2,399,314 | Barker | Apr. 30, 1946 |

FOREIGN PATENTS

| Number | Country | Date |
| --- | --- | --- |
| 29,757 | Great Britain | of 1913 |